(12) United States Patent
Svensson et al.

(10) Patent No.: US 9,965,835 B2
(45) Date of Patent: May 8, 2018

(54) DEFOGGING IMAGES AND VIDEO

(71) Applicant: Axis AB, Lund (SE)

(72) Inventors: Fredrik Svensson, Lund (SE); Per Kannermark, Malmo (SE); Andreas Nilsson, Haljarp (SE)

(73) Assignee: Axis AB, Lund (SE)

( * ) Notice: Subject to any disclaimer, the term of this patent is extended or adjusted under 35 U.S.C. 154(b) by 0 days. days.

(21) Appl. No.: 14/555,803

(22) Filed: Nov. 28, 2014

(65) Prior Publication Data

US 2016/0155218 A1 Jun. 2, 2016

(51) Int. Cl.
*G06K 9/00* (2006.01)
*G06T 5/00* (2006.01)
*G06T 5/40* (2006.01)

(52) U.S. Cl.
CPC ........... *G06T 5/009* (2013.01); *G06T 5/40* (2013.01)

(58) Field of Classification Search
CPC ........ G06T 7/408; G06K 9/38; G06K 9/4642; H04N 1/4074
See application file for complete search history.

(56) References Cited

U.S. PATENT DOCUMENTS

| | | | | |
|---|---|---|---|---|
| 4,409,012 A | * | 10/1983 | Miller | C03B 5/245 356/426 |
| 8,295,596 B1 | * | 10/2012 | Srinivasan | G06T 5/40 348/234 |
| 2006/0056056 A1 | * | 3/2006 | Ahiska | G08B 13/19608 359/690 |
| 2011/0110567 A1 | | 5/2011 | Jiang | |
| 2012/0000982 A1 | * | 1/2012 | Gao | G06K 7/146 235/455 |
| 2012/0090834 A1 | * | 4/2012 | Imhof | G01V 1/32 166/250.01 |

OTHER PUBLICATIONS

Fisher, R. et al., "Intensity Histogram," Image Analysis—Intensity Histogram, retrieved from http://homepages.inf.ed.ac.uk/rbf/HIPR2/histgram.htm, 5 pages, 2003, (published before this application Nov. 2014).

* cited by examiner

*Primary Examiner* — Eueng-Nan Yeh
(74) *Attorney, Agent, or Firm* — Snyder, Clark, Lesch & Chung, LLP

(57) ABSTRACT

A method and system are disclosed. The method may include determining a histogram of intensity values for pixels in image sensor data in which the histogram is bimodal. The method may include determining a breakpoint between the two modes. The histogram may include a first distribution of intensity values below the breakpoint and a second distribution of intensity values above the breakpoint. The method may include generating output intensity values. Generating output intensity values may include compressing the first distribution of intensity values of the pixels with intensity values below the breakpoint, stretching the second distribution of intensity values of the pixels with intensity values above the breakpoint, and generating an output image based on the output intensity values.

18 Claims, 12 Drawing Sheets

DEFOGGING IMAGES AND VIDEO

BACKGROUND INFORMATION

As cameras and other monitoring devices become less expensive, these devices are proliferating. As these devices proliferate, "stations" or "hubs" monitor the status of these devices. For example, an operator may sit at a "camera station" to monitor a group of cameras. At times, however, clouds of fog may obscure or shroud an object in the field of view of a camera. As a result, the operator may not be able to discern the shrouded object.

SUMMARY

Methods are disclosed. In one embodiment, the method includes determining a histogram of intensity values for pixels in image sensor data. The histogram may be bimodal. The method may include determining a breakpoint between the two modes, where histogram includes a first distribution of intensity values below the breakpoint and a second distribution of intensity values above the breakpoint. The method may include generating output intensity values by compressing the first distribution of intensity values of the pixels with intensity values below the breakpoint, stretching the second distribution of intensity values of the pixels with intensity values above the breakpoint, and generating an output image based on the output intensity values.

In one embodiment, the image is a current image in a video stream and the video stream includes a previous image in the video stream. In one embodiment, the method may further include determining a previous histogram of intensity values for pixels in the previous image, wherein the previous histogram is bimodal; determining a previous breakpoint between the two modes of the previous histogram; and determining the breakpoint for the current image based on the previous breakpoint.

In one embodiment, the video stream includes a plurality of previous images, and the breakpoint for the current image is determined based on a plurality of previous breakpoints between modes in the corresponding plurality of previous images. In one embodiment, determining the current breakpoint includes applying a low-pass filter to the plurality of previous breakpoints.

In one embodiment, the method may further include generating an output video stream based on the output intensity values; compressing the output video stream to generate a compressed video stream; and transmitting the compressed video stream to a monitoring station. In one embodiment, the method may include determining if the histogram is bimodal. In one embodiment, determining if the histogram is bimodal includes determining if the histogram includes two local maxima. In one embodiment, determining if the histogram is bimodal includes determining if the pixel intensities are clustered around two separated values.

In one embodiment, stretching the second distribution of intensity values includes stretching the second distribution of intensity values to include intensity values below the breakpoint. In one embodiment, a user-defined parameter determines an extent to which stretching the second distribution of intensity values includes intensity values below the breakpoint.

Devices are also disclosed. In one embodiment a device may include a camera to capture an image and generate image sensor data and a processor. The processor may be configured to determine a histogram of intensity values for pixels in the image sensor data, wherein the histogram is bimodal, and determine a breakpoint between the two modes, wherein the histogram includes a first distribution of intensity values below the breakpoint and a second distribution of intensity values above the breakpoint. The processor may be configured to generate output intensity values by compressing the first distribution of intensity values of the pixels with intensity values below the breakpoint, and stretching the second distribution of intensity values of the pixels with intensity values above the breakpoint. The processor may also be configured to generate an output image based on the output intensity values.

In one embodiment, the image is a current image in a video stream. The video stream may include a previous image, and the processor may be further configured to determine a previous histogram of intensity values for pixels in the previous image. The previous histogram may be bimodal. The processor may also be configured to determine a previous breakpoint between the two modes of the previous histogram, and determine the breakpoint for the current image based on the previous breakpoint.

In one embodiment, the video stream may include a plurality of previous images. When determining the breakpoint for the current image, the processor is further configured to determine the breakpoint of the current image based on a plurality of previous breakpoints between modes in the corresponding plurality of previous images.

The processor may be configured to determine the current breakpoint by applying low-pass filter logic to the plurality of previous breakpoints. The processor may be further configured to generate an output video stream based on the output intensity values; and compress the output video stream to generate a compressed video stream, wherein the device further includes a transmitter to send the compressed video stream across a network to a monitoring station.

The processor may be configured to determine if the histogram is bimodal. In one embodiment, the processor determines if the histogram is bimodal by determining if the histogram includes two local maxima. In one embodiment, the processor determines if the histogram is bimodal by determining if pixel intensities are clustered around two separated values.

In one embodiment, the processor may be configured to stretch the second distribution of intensity values to include intensity values below the breakpoint. In another embodiment, the processor may be configured to stretch the second distribution of intensity values to include intensity values below the breakpoint to an extent based on a user-defined parameter.

DETAILED DESCRIPTION OF EMBODIMENTS

The following detailed description refers to the accompanying drawings. The same reference numbers in different drawings identify the same or similar elements.

As noted above, an operator may sit at a "camera station" to monitor a group of cameras. At times, however, clouds of fog may obscure or shroud an object in the field of view of a camera. As a result, the operator may not be able to discern the shrouded object. As described below, methods and systems allow for an operator to turn on a "defogging" feature in a camera. The defogging feature improves the contrast of objects shrouded by the cloud of fog. After defogging, the operator may be able to discern objects shrouded by the cloud of fog.

Cameras, particularly legacy cameras that are already deployed, usually have limited processing power to perform image processing (such as cloud/fog/object identification, contrast enhancement, etc.). The limited processing power of a camera makes defogging (by the camera) challenging (particularly when streaming video in real-time). While a monitoring station may have more processing power than a camera, the monitoring station may not be well situated to perform defogging (e.g., without increasing bandwidth requirements). Cameras generally alter raw image data (e.g., demosaicing and/or lossy compression) to conserve bandwidth before transmitting the image or video to a monitoring station. Therefore, the monitoring station likely does not have easy access to the raw image data captured by the camera. Thus, the monitoring station does not have the best data to perform defogging.

Methods and systems described below enable a camera to defog an image and/or video with, in one embodiment, the limited processing power of a camera. Further, in one embodiment, because the defogging is performed by the camera itself, the methods and systems described below have access to the raw images captured by the camera before compression and transmission to the monitoring station for viewing by an operator. Even though embodiments described below enable a camera with limited processing power to defog an image, methods described below may be used by devices other than cameras with more powerful processors.

Figure 1A:
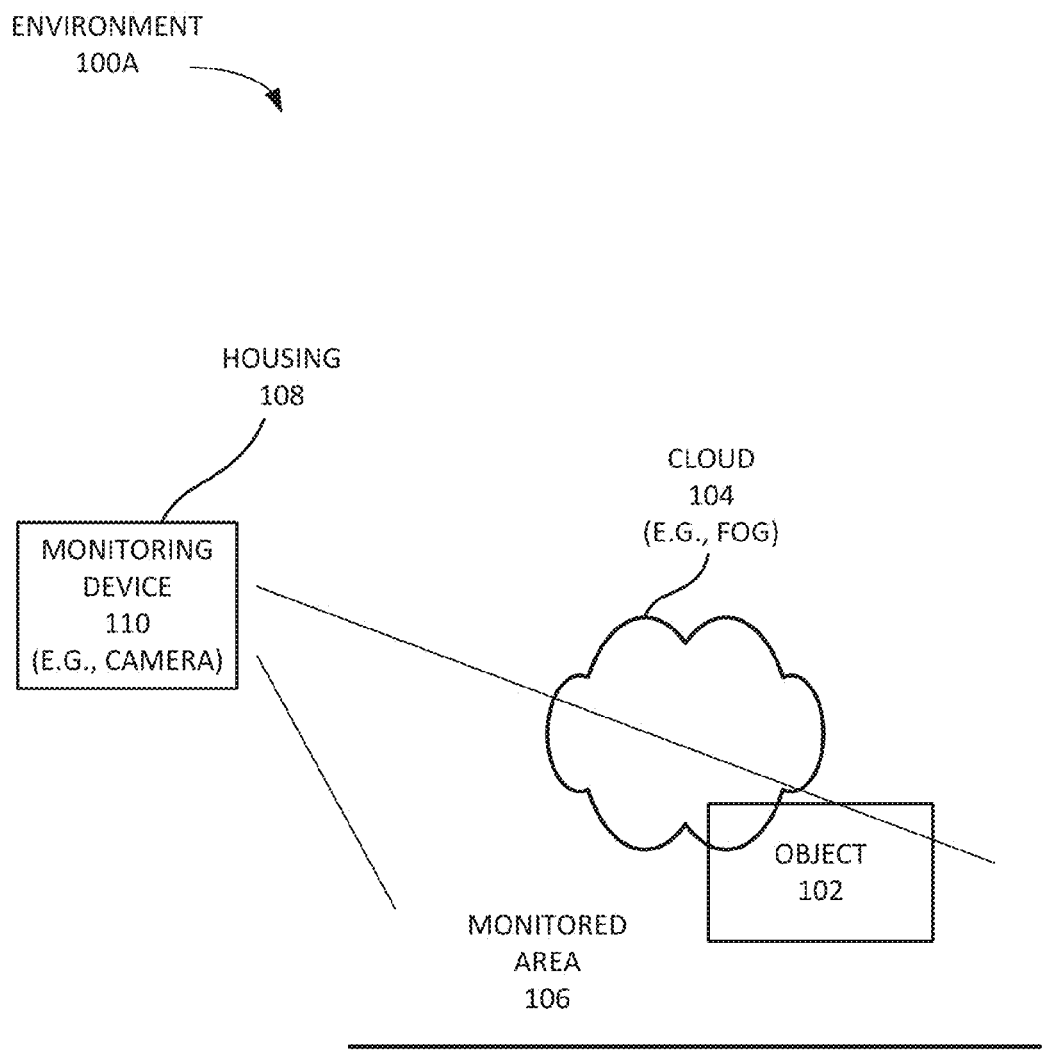
FIG. 1A is a diagram of an exemplary monitoring device (e.g., a camera) monitoring an area with a cloud shrouding an object.

FIG. 1A is a diagram of an exemplary monitoring device 110 (e.g., a camera) monitoring an area 106 having a cloud 104 shrouding an object 102. Object 102 may include a particular object of interest, a person, an animal, an area being monitored, and/or another type of entity of interest. Object 102 may be behind cloud 104, in cloud 104, or both. As shown in FIG. 1A, monitoring device 110 in this example is a camera (which may referred to as camera 110) with a housing 108. If monitoring area 106 is installed outdoors, for example, monitored area 106 may include a cloud 104 (such as fog) that obscures an object 102. If monitoring device 110 is installed above a door, monitored area 106 may nonetheless still include cloud 104 that obscures object 102 from the perspective of monitoring device 110. For example, cloud 104 may envelope all or part of object 102 or impede the transmission of light from object 102 to a light sensor in monitoring device 110. Cloud 104 may include fog, smoke, tear gas, mist, frosted or clouded glass, etc.

Monitoring device 110 (e.g., as a camera) may include one or more devices for capturing images of monitored area 106. Monitoring device 110 may include, for example, a video camera that captures image data using visible light, infrared light, and/or other non-visible electromagnetic radiation. The captured image data may include a continuous image sequence (e.g., video), a limited image sequence, still images, and/or a combination thereof. Monitoring device 110 may include a digital camera for capturing and digitizing images and/or an analog camera for capturing images and storing image data in an analog format.

Figure 1B:
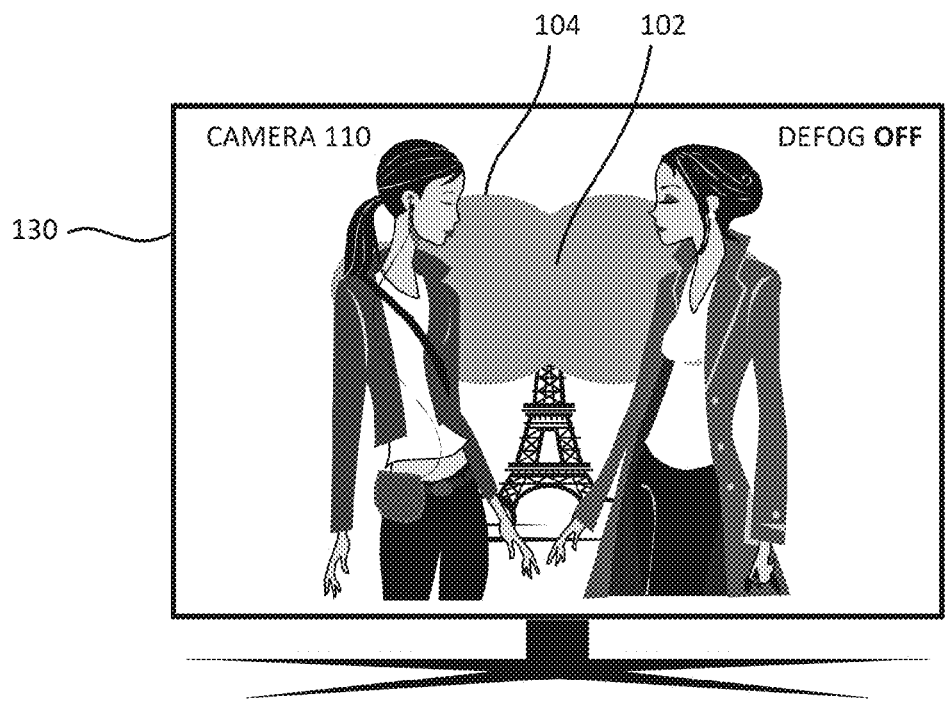
FIGS. 1B and 1C illustrate an exemplary monitoring station showing images of an object shrouded by a fog cloud.
Figure 1C:
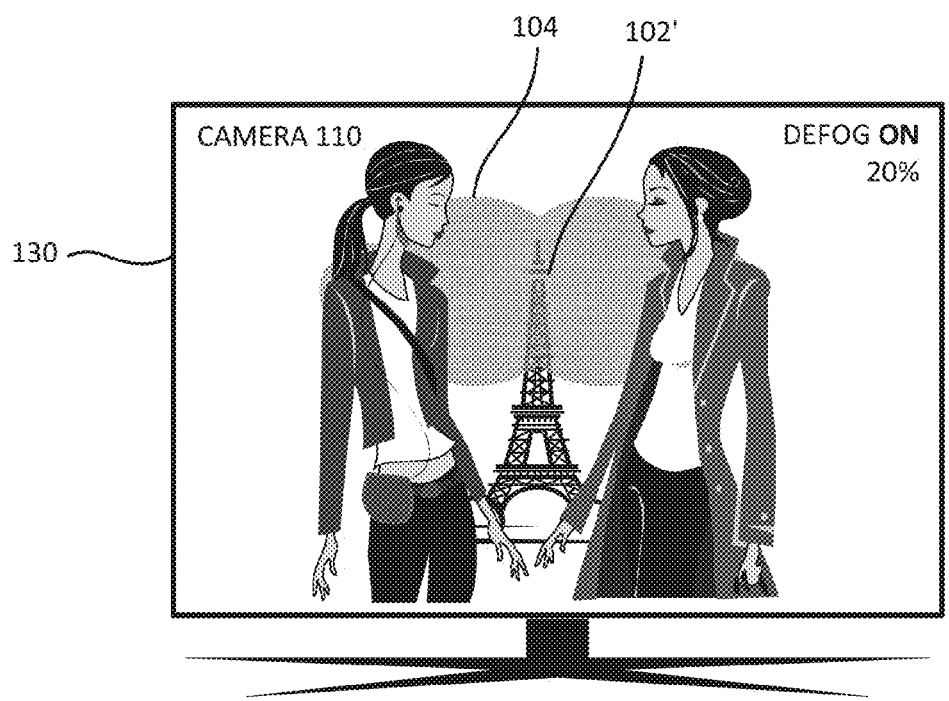

Although not shown in FIG. 1A, video and/or images captured by monitoring device 110 may be transmitted (e.g., streamed) to a monitoring station where the images are viewed by an operator on a display. FIG. 1B is an illustration of a monitoring station 130, showing an image from monitoring device 110 (i.e., camera 110) on a display. Station 130 in FIG. 1B shows what appears to be the Eiffel tower (object 102), but the top of the tower is obscured by fog (cloud 104). Although cloud 104 appears dark in FIGS. 1B and 1C, in practice cloud 104 may appear bright with a high intensity (e.g., luminance). As shown in FIG. 1C, after defogging (described below), contrast is improved and the top of the Eiffel tower (object 102') is more visible to the operator of monitoring station 130.

Figure 1D:
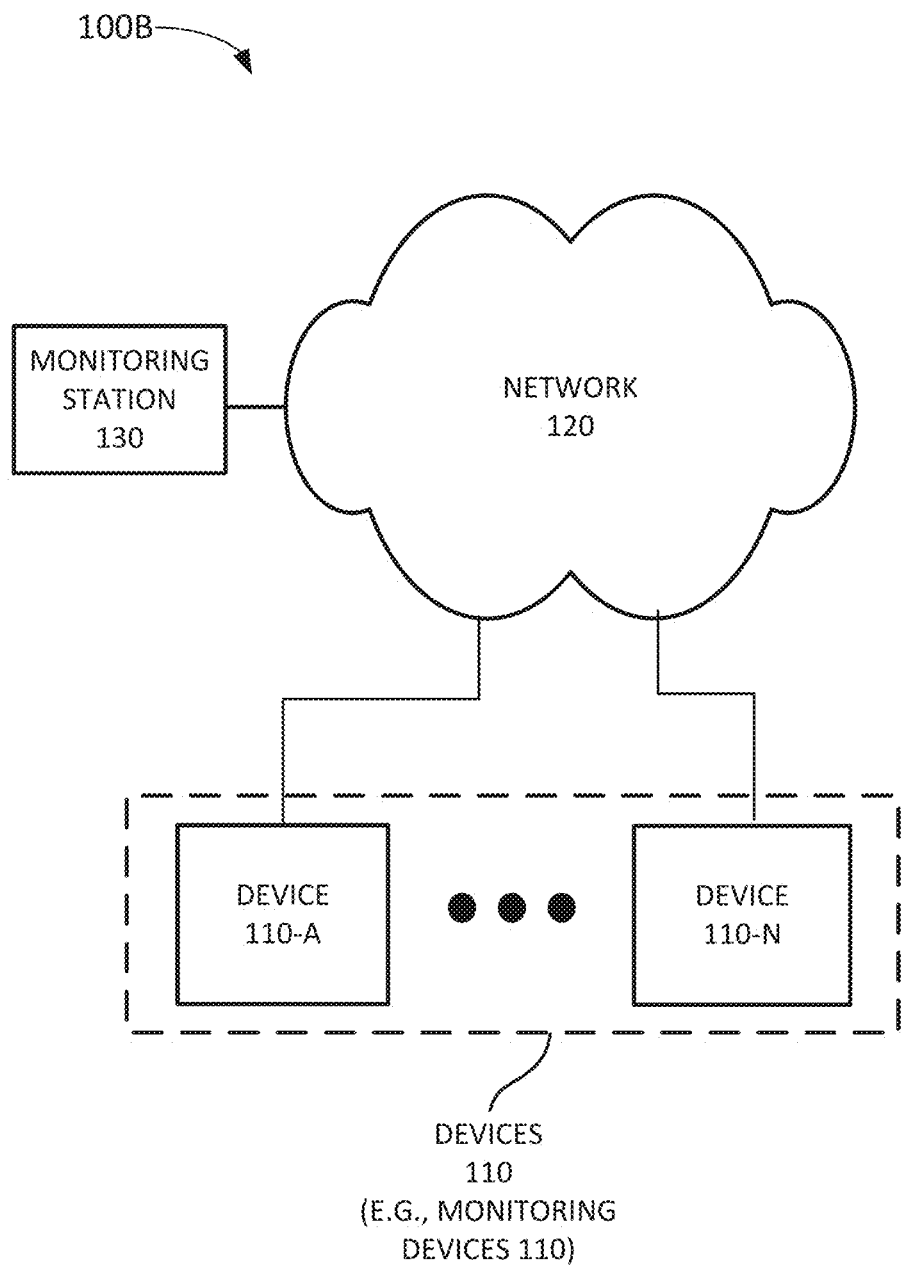
FIG. 1D is a diagram of another exemplary environment in which methods and systems described herein may be implemented.

FIG. 1D is a block diagram of another exemplary environment 100B in which the systems and methods described herein may be implemented. As shown in FIG. 1D, environment 100B may include monitoring devices 110, a network 120, and a monitoring station 130. Devices 110 may include devices 110-A through 110-N (referred to collectively as "devices 110" and individually as "device 110"). As noted above, monitoring device 110 may include a camera. Additionally or alternatively, device 110 may include a thermal camera, a heat detector, a smoke detector, a carbon monoxide detector, a humidity detector, a temperature detector, a motion detector (e.g., image based, infrared based, etc.), an open/closed detector, etc.

In another embodiment, device 110 may include a controller with one or more peripherals connected to the controller (such as the devices listed above). In one embodiment, devices 110 may include a physical access control system (PACS). For example, a particular device 110 may include a controller that controls access to a secure area, such as a room or a group of rooms. As a physical access controller, device 110 may receive credentials (e.g., access card credentials) via a reader device and may determine whether the credentials are authentic and associated with authority to access the secure area. If so, the controller may issue a command to open a lock on a door or perform other operations associated with granting access to the secure area. The PACS may include a camera that captures images of a particular area, such as an area in front of the door. The camera may be used, for example, to identity of a person attempting to gain access to the secure area.

Network 120 may enable devices in environment 100B to communicate with each other. For example devices 110 may communicate with each other and monitoring station 130 and/or monitoring station 130 may communicate with any one of devices 110. Network 120 may include one or more circuit-switched networks and/or packet-switched networks. For example, network 120 may include a local area network (LAN), a wide area network (WAN), a metropolitan area network (MAN), a Public Switched Telephone Network (PSTN), an ad hoc network, a wireless mesh network, an intranet, the Internet, a fiber optic-based network, a wireless network, and/or a combination of these or other types of networks.

Monitoring station 130 enables an operator to connect to a particular device 110 to configure the device, change a configuration of device 110, receive information from device 110, and/or otherwise administer device 110. Monitoring station 130 may also enable an operator to monitor environment 100B (including devices 110). For example, an operator may monitor environment 100B for intrusion detection (e.g., device 110 as a camera to secure a building), for flooding, etc.

Monitoring station 130 may include any device configured for communicating with device 110. For example, monitoring station 130 may include a portable communication device (e.g., a mobile phone, a smartphone, a wearable computer device, a global positioning system (GPS) device, and/or another type of wireless device); a personal computer or workstation (e.g., with a monitor, keyboard, mouse, etc.); a server device; a laptop, tablet, or another type of portable computer; and/or any type of device with communication capability. In one embodiment, monitoring station 130 may be part of device 110. As such, an operator may monitor any device 110 from one or more of devices 110.

Furthermore, monitoring station 130 may include one or more devices, such as computer devices or modules, for receiving data (e.g., event messages, video, or images) from devices 110. For example, monitoring station 130 may include one or more displays for displaying image data captured by device 110 (e.g., a camera) and/or may include one or more storage devices for storing the captured image data.

Although FIGS. 1A and 1D show exemplary components of environments 100A and 100B, in other implementations, environments 100A and 100B may include fewer components, different components, differently arranged components, or additional components than depicted in FIGS. 1A and 1D. Additionally or alternatively, any one device (or any group of devices) may perform functions described as performed by one or more other devices.

Figure 2:
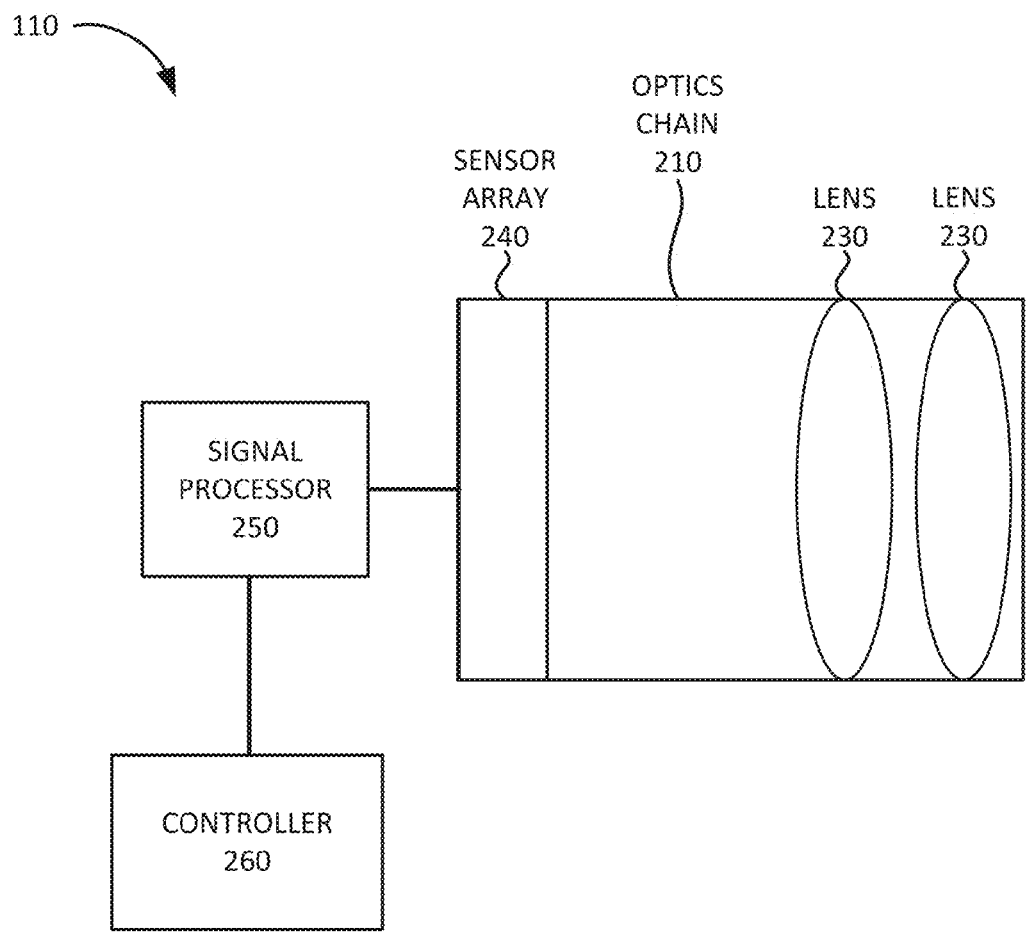
FIG. 2 is a block diagram illustrating exemplary components of a monitoring device (e.g., a camera) in one embodiment.

FIG. 2 is a diagram illustrating exemplary components of a monitoring device 110 (e.g., camera 110) in one embodiment. As shown in FIG. 2, monitoring device 110 may include an optics chain 210, a sensor array 240, a signal processor 250, and a controller 260.

Optics chain 210 may include an enclosure that directs incident light to a sensor array 240 to capture an image based on the incident light. Optics chain 210 may include lenses 230, as well as the sensor array 240. Lenses 230 may collect and focus the incident light from monitored area 106 onto sensor array 240. In one situation, cloud 104 (e.g., fog) may reside in camera 110, such as in optics chain 210 or within a protective dome (e.g., housing 108) encasing optics chain 210. In this situation, cloud 104 in camera 110 obscures object 102, which may cause a need for defogging.

Sensor array 240 may include an array of sensors for registering, sensing, and measuring light incident or falling onto sensor array 240. The light may be in the visible light wavelength range, the infrared light wavelength range, or other wavelength ranges. Sensor array 240 may include, for example, a charged coupled device (CCD) array and/or an active pixel array (e.g., a complementary metal-oxide-semiconductor (CMOS) sensor array). Sensor array 240 may also include a microbolometer (e.g., when device 110 includes a thermal camera or detector).

Sensor array 240 outputs data that is indicative of the light (e.g., describes properties or characteristics of the light) incident on sensor array 240. For example, the data output from sensor array 240 may include information such as the intensity of light (e.g., luminance), color, etc., incident on one or more pixels in sensor array 240. The light incident on sensor array 240 may be an "image" in that the light may be focused as a result of lenses 230. Sensor array 240 can be considered an "image sensor" because it senses images falling on sensor array 240. As the term is used herein, an "image" includes the data indicative of the light (e.g., describing the properties or characteristics of the light) incident on sensor array 240. Accordingly, the term "image" may also be used to mean "image sensor data." Further, a "pixel" means any region or area of sensor array 240 for which measurement(s) of light are taken (e.g., measurements that are indicative of the light incident on sensor array 240). A pixel may correspond to one or more (or less than one) sensor(s) in sensor array 240.

Signal processor 250 performs signal processing operations on image data captured by sensor array 240. Controller 260 may control the operation of signal processor 250 as well as the rest of camera 110. Controller 260 (e.g., in conjunction with signal processor 250) may perform signal processing to defog or improve the contrast of objects shrouded by fog, for example. Operation of controller 260 and/or signal processor 250 is described below in greater detail with reference to FIG. 4.

Although FIG. 2 shows exemplary components of monitoring device 110, in other implementations, monitoring device 110 may include fewer components, different components, differently arranged components, or additional components than depicted in FIG. 2. Additionally or alternatively, one or more components of monitoring device 110 may perform functions described as being performed by one or more other components of monitoring device 110.

Figure 3:
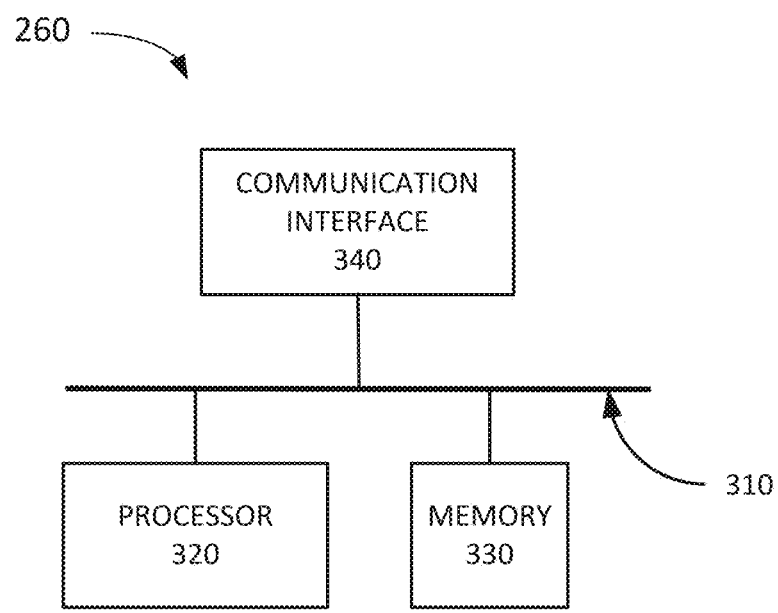
FIG. 3 illustrates exemplary components of the controller of FIG. 2 in one embodiment.

FIG. 3 is a diagram illustrating example components of controller 260 in one embodiment. As shown in FIG. 3, controller 260 may include a bus 310, a processor 320, a memory 330, and a communication interface 340. Bus 310 includes a path that permits communication among the components of controller 260. Processor 320 may include any type of single-core processor, multi-core processor, microprocessor, latch-based processor, and/or processing logic (or families of processors, microprocessors, and/or processing logics) that interprets and executes instructions. In other embodiments, processor 320 may include an application-specific integrated circuit (ASIC), field-programmable gate array (FPGA), and/or another type of integrated circuit or processing logic.

Memory 330 may include any type of dynamic storage device that may store information and/or instructions, for execution by processor 320, and/or any type of non-volatile storage device that may store information for use by processor 320. For example, memory 330 may include a random access memory (RAM) or another type of dynamic storage device, a read-only memory (ROM) device or another type of static storage device, a content addressable memory (CAM), a magnetic and/or optical recording memory device and its corresponding drive a hard disk drive, optical drive, etc.), and/or a removable form of memory, such as a flash memory.

Communication interface 340 may include a transceiver that enables controller 260 to communicate with other devices and/or systems via wireless communications (e.g., radio frequency, infrared, and/or visual optics, etc., wired communications (e.g., conductive wire, twisted pair cable, coaxial cable, transmission line, fiber optic cable, and/or waveguide, etc.), or a combination of wireless and wired communications. Communication interface 340 may include a transmitter that converts baseband signals to radio frequency (RF) signals and/or a receiver that converts RF signals to baseband signals. Communication interface 340 may be coupled to an antenna for transmitting and receiving RF signals.

Communication interface 340 may include a logical component that includes input and/or output ports, input and/or output systems, and/or other input and output components that facilitate the transmission of data to other devices. For example, communication interface 340 may include a network interface card (e.g., Ethernet card) for wired communications and/or a wireless network interface (e.g., a WiFi) card for wireless communications. Communication interface 340 may also include a universal serial bus (USB) port for communications over a cable, a Bluetooth wireless interface, a radio-frequency identification (RFID) interface, a near-field communications (NFC) wireless interface, and/or any other type of interface that converts data from one form to another form.

Camera 110 (e.g., controller 260 and/or signal processor 250) may perform certain operations relating to improving the readability, understandability, and/or contrast in an image or a video. For example, camera 110 may improve the contrast in areas of an image or video that includes fog (i.e., defogging). Controller 260 may perform these operations in response to processor 320 executing software instructions contained in a computer-readable medium, such as memory 330. A computer-readable medium includes a non-transitory memory device.

The memory device may be implemented within a single physical memory device or spread across multiple physical memory devices. The software instructions may be read into memory 330 from another computer-readable medium or from another device. The software instructions contained in memory 330 may cause processor 320 to perform processes described herein. Alternatively, hardwired circuitry (e.g., logic) may be used in place of, or in combination with, software instructions to implement processes described herein. Thus, implementations described herein are not limited to any specific combination of hardware circuitry and software.

In other implementations, controller 260 may include fewer components, different components, additional components, or differently arranged components than depicted in FIG. 3. Additionally or alternatively, one or more components of controller 260 may perform one or more tasks described as being performed by one or more other components of controller 260.

Figure 4:
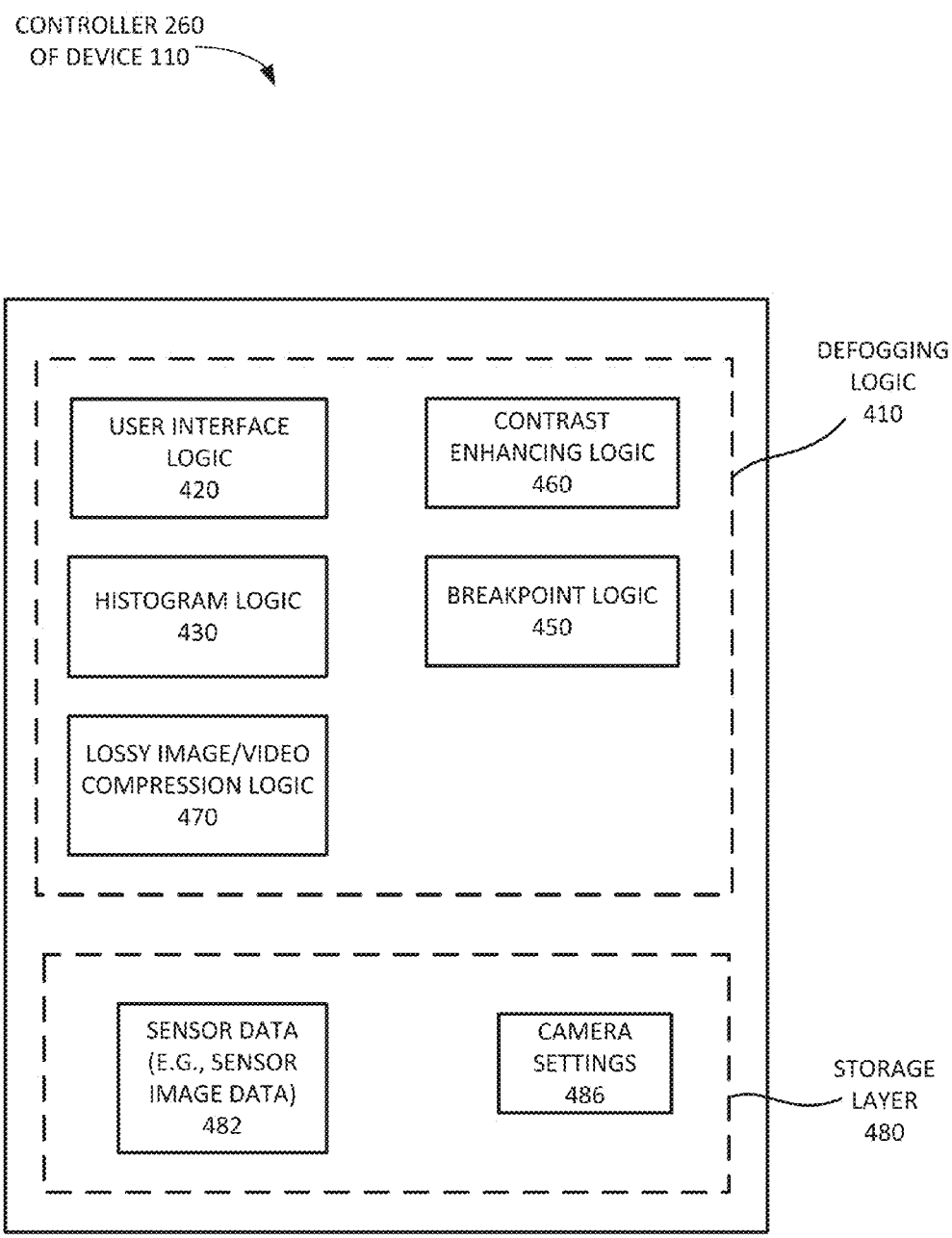
FIG. 4 is a block diagram illustrating exemplary functional components of the controller of FIG. 2.

FIG. 4 is a block diagram illustrating exemplary functional components of controller 260. The functional components of controller 260 may be implemented, for example, via processor 320 executing instructions from memory 330. Alternatively, some or all of the functional components of controller 260 may be hardwired and/or performed by signal processor 250.

As shown in FIG. 4, controller 260 may include defogging logic 410 and storage layer 480. Defogging logic 410 inputs an image sensor data, determines if fog is present in part of the image, and improves the contrast of the image so as to improve the visibility of objects obscured or shrouded by clouds of fog (e.g., contrast enhancement). Defogging logic 410 uses storage layer 480 to store image sensor data 482 and camera settings 486, for example. Defogging logic 410 may employ interface logic (UI) logic 420, histogram logic 430, breakpoint logic 450, and contrast enhancing logic 460 (or "enhancing logic 460") to defog an image or video, as described below.

Histogram logic 430 inputs the intensity values of pixels in image sensor data (e.g., captured by sensor array 240) and generates a histogram of intensity values for pixels in an image. In other words, histogram logic 430 counts the number of pixels in an image at different intensity values (e.g., at each possible intensity value). In one embodiment, histogram logic 430 operates on raw image data (or image data compressed in a lossless manner) rather than working on compressed (e.g., lossy compression) image data. By using raw image data, the number of possible values for intensity may be maintained for contrast enhancement. In other embodiments, histogram logic 430 may use compressed (e.g., lossy compression) image data. In one embodiment, the histogram output from histogram logic 430 is an estimation or approximation of the true histogram of intensity values. In this latter embodiment, histogram logic 430 may determine that the image sensor data is bimodal and a candidate for defogging from the histogram that is an estimate. Such a histogram (as an estimation) may increase processing speed, for example. As used herein, the term "histogram" means "distribution."

Figure 5A:
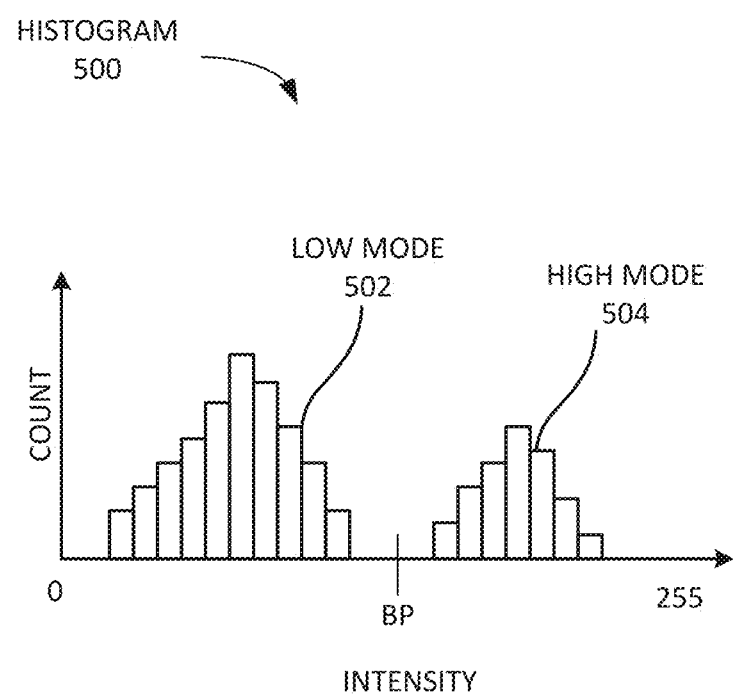
FIGS. 5A, 5B, and 5C are histograms of intensity values of pixels in image sensor data in one example.

FIG. 5A is an example of an intensity histogram 500 of an image. The abscissa (x axis) of the histogram 500 in FIG. 5A shows units of intensity. The farther from the origin along the abscissa, the higher the intensity. Intensity values may range from 0 to 255, if sensor array 240 quantized the information in such a way. As noted, intensity values may represent luminance (e.g., flux) measurements.

The ordinate (y axis) of histogram 500 in FIG. 5A shows units of the number of pixels. The farther from the origin along the ordinate, the greater the number of pixels. Therefore, histogram 500 shows the number of pixels having the corresponding intensity value. In the example of FIG. 5A, histogram 500 is bimodal (e.g., has a bimodal distribution or a distribution with two different modes). Histogram logic 430 may determine that a histogram is bimodal when the histogram includes two local maxima (e.g., only two local maxima). Histogram logic 430 may also determine that a histogram is bimodal when the histogram includes pixel intensities that are clustered around two separate values (e.g., two distinct values). FIG. 5A shows a first mode (e.g., low mode 502) and a second mode (e.g., high mode 504) of a bimodal histogram.

In one embodiment, when the intensity histogram is bimodal, defogging logic 410 may determine that fog is present in part of the image. In this case, defogging logic 410 may determine to perform a defogging operation to enhance the contrast in the image (and improve the contrast of the image in the clouded area) for viewing by an operator.

When the intensity histogram is not bimodal, defogging logic 410 may determine that fog is not present in part of the image and/or may determine not to perform a defogging operation. An intensity histogram may not be bimodal even when fog is present, for example, when the entire image (e.g., the entire field of view of camera 110) is shrouded in fog.

Returning to FIG. 4, breakpoint logic 450 determines the boundary between the two modes in a bimodal histogram. As shown in FIG. 5A, breakpoint logic 450 determines the breakpoint to be at intensity value BP. Breakpoint logic 450 may determine the breakpoint, for example, by determining the local minimum value between the two local maxima values of the bimodal histogram. Breakpoint logic 450 determines the breakpoint between the two modes such that the histogram includes a first range of intensity values below the breakpoint and a second range of intensity values above the breakpoint. In one embodiment, breakpoint logic 450 may use an estimate or an approximation of the true histogram of intensity values (e.g., as output from histogram logic 430). In this latter embodiment, breakpoint logic 430 may sufficiently determine the breakpoint from an estimate of the true histogram (e.g., sufficient enough for further processing). An estimation may increase processing speed, for example. Pixels associated with original intensity values (e.g., before any transformation) above the original breakpoint (e.g., before any transformation) can be referred to as "high-mode pixels." Pixels associated with original intensity values (e.g., before any transformation) below the original breakpoint (e.g., before any transformation) can be referred to as "low-mode pixels."

In one embodiment, pixels that have intensity values above the breakpoint (high-mode pixels) are considered to be in a fog area of an image, and pixels that have intensity values below the breakpoint (low mode pixels) are considered not to be in the fog area of the image. While this assumption may allow for faster processing of images with fog, the assumption may not be entirely correct (and may likely not be entirely correct). That is, some high-mode pixels very well may be outside the area of fog and some low-mode pixels may be inside the area of fog. Nonetheless, this assumption allows for easier processing (e.g., for a low powered, inexpensive, camera).

Contrast enhancing logic 460 changes or transforms the intensity level (e.g., luminance) of pixels in an image (e.g., an image captured by sensor array 240). In one embodiment, enhancing logic 460 stretches the range of intensity values for pixels with intensity values above the breakpoint (high-mode pixels). In other words, enhancing logic 460 stretches (a stretching transformation) the distribution of intensity values for pixels with (untransformed) intensity values above the breakpoint. Therefore, objects shrouded by a cloud of fog (pixels with high intensity value) may have enhanced contrast for an operator to see better. For example, if the intensity values for high-mode pixels do not span the entire range of values above the breakpoint, the values can be stretched (e.g., linearly transformed) to occupy the entire range. In other words, the distribution of intensity values of high-mode pixels is widened (e.g., relative to the rest of the distribution). An example of stretching the intensity values in an image is shown in FIG. 5B.

Figure 5B:
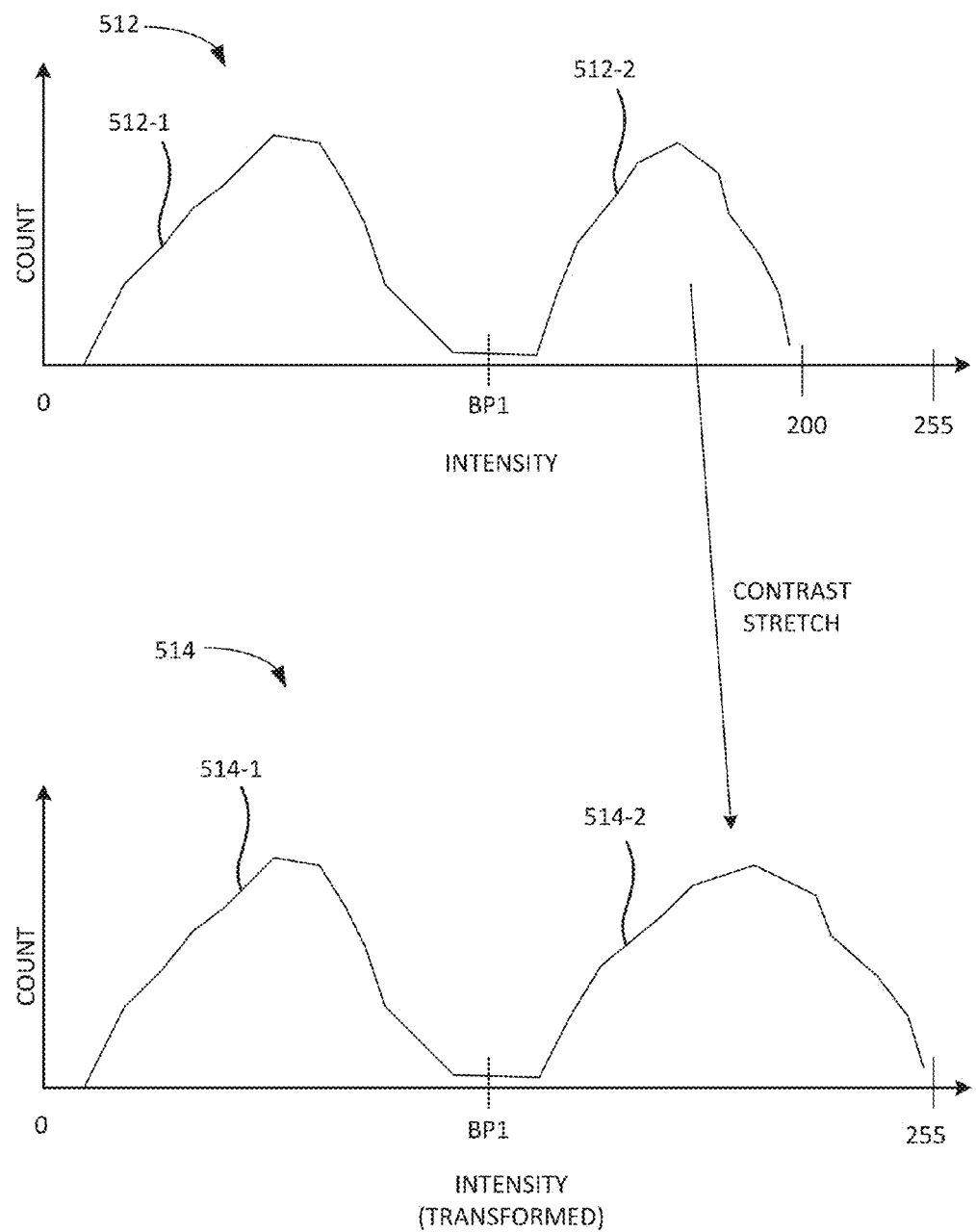

FIG. 5B shows a bimodal histogram 512 of intensity values of image sensor data. Breakpoint logic 450 has determined a breakpoint BP1 between the two modes (a low mode 512-1 and a high mode 512-2). Although histogram 512 appears as a continuous line, histogram 512 is discrete because both intensity values and pixel count are discrete values. In the example of FIG. 5B, histogram 512 (e.g., high mode 512-2) does not include any (or only a few) intensity values above 200. In one embodiment, enhancing logic 460 stretches (e.g., linearly transforms) the intensity values of pixels above breakpoint BP1 (high-mode pixels), such that the histogram of the resulting image is as shown in histogram 514 (of transformed intensity values). For example, the transformed intensity values may be the original intensity values (minus BP1) times a number greater than 1 (plus BP1). In other words, the distribution of intensity values of high-mode pixels is widened relative to the rest of the distribution. In the example of FIG. 5B, the low-mode intensity values are not transformed (and low mode 512-1 is the same as low mode 514-1) (or the transformation results in the same distribution of intensity values). Therefore, as shown in FIG. 5B, the breakpoint of histogram 514 is BP1, the same as histogram 512 of the original intensity values.

Figure 5C:
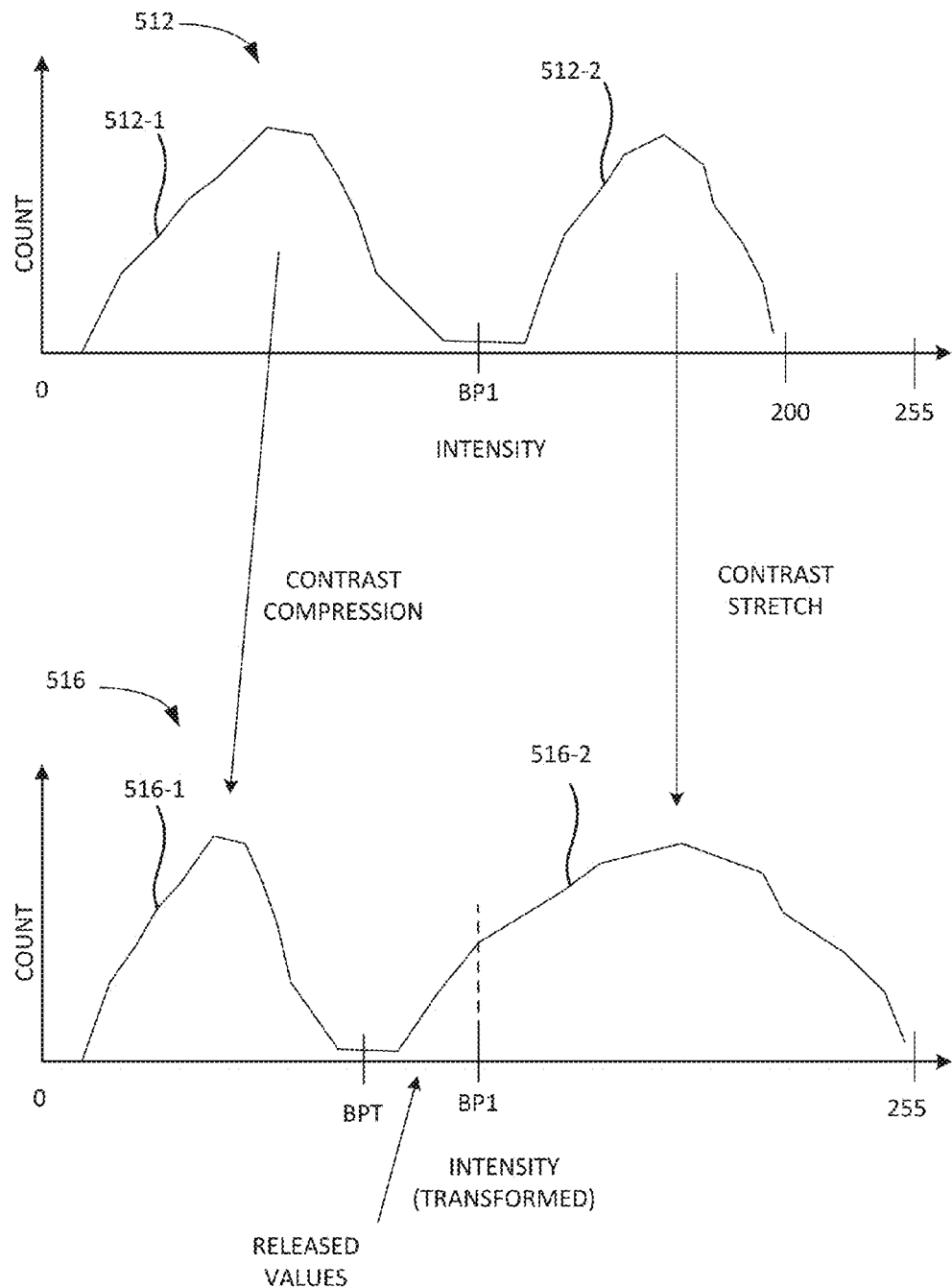

Enhancing logic 460 may also compress the range of intensity values for pixels with intensity values below the breakpoint (low-mode pixels). FIG. 5C shows a bimodal histogram 512 (the same histogram as shown in FIG. 5B). In one embodiment, enhancing logic 460 compresses (e.g., linearly transform) the intensity values of pixels with original intensity values below breakpoint BP1 (low-mode pixels). The histogram of the resulting image is as shown in histogram 516 (with transformed intensity values). For example, the transformed intensity values (low mode 516-1) may be the original intensity values (low mode 512-1) times a number less than 1. In other words, enhancing logic 460 compresses (a compressing transformation) the distribution of intensity values for pixels with (untransformed) intensity values below the breakpoint (e.g., low-mode pixels) relative to the rest of the distribution. In one embodiment, the extent to which the low-intensity mode is compressed is based on a factor provided by the user (a user-defined parameter) through UI logic 420. In one embodiment, enhancing logic 460 may also linearly displace low mode 512-1 (e.g., to the left) if there are unused low intensity values not being used to generate the new intensity values (low mode 516-1).

In one embodiment, enhancing logic 460 may output intensity values that have a different range than the input intensity values. For example, the input intensity values may be from 0 to 255 (8 bits), while the output intensity values may be from 0 to 512 (9 bits) or 0 to 128 (7 bits). In this case, enhancing logic 460 transforms the distribution of intensity values (e.g., the distribution of the input intensity values versus the distribution of the output intensity values). Because enhancing logic 460 may use raw image data, the full range of possible values for expressing transformed intensity may be maintained for contrast enhancement (e.g., for best results, even if the output range of values may be different from the input range of values). Therefore, although histograms 514 and 516 in FIGS. 5B and 5C show output intensity value ranges from 0 to 255, the output ranges may be different (e.g., 0 to 128) in different implementations. Also, while histograms 514 and 516 show the distribution of intensity values after transformation, histograms 514 and 516 may not actually be calculated or determined after transformation. Nonetheless, the transformed intensity values may have the distributions shown in histograms 514 and 516.

Further, enhancing logic 460 may transform the histogram simultaneously or as part of other image processing performed on sensor image data. For example, camera 110 may transform the histogram as part of demosaicing and/or tone reproduction of the raw image data. That is, camera 110 (e.g., signal processor 250 and/or controller 260) may already be constructing a full-color image from the raw color samples output by sensor array 240 and may be mapping the luminance and color in a way that is better suited for display luminance (e.g., for monitoring device 130). As part of this process, enhancing logic 460 may transform the intensity histogram of the raw sensor image data to a transformed histogram of the display image. Because the transformation of intensity values may occur with processes that camera 110 is already performing, camera 110 may not burdened with significant extra processing.

Because the pixels with lower intensity values (low-mode pixels of low mode 512-1) likely are not shrouded by fog and (presumably in this example) have sufficient contrast for an operator to recognize objects, the contrast may be compressed (generating low mode 516-1) to provide for more intensity values (e.g., more bits or symbols) to be used for pixels having original intensity values greater than BP1 (high-mode pixels). Accordingly, in the situation in which contrast is compressed, enhancing logic 460 may further stretch the original intensity values for pixels with an intensity greater than BP1 (high-mode pixels of high mode 512-2). As shown in FIG. 5C, high-mode pixels (of high mode 512-2) may be represented with intensity values previously used for low-mode pixels (of low mode 512-1). As a result, histogram 516 (with transformed intensity values) has a breakpoint BPT that has shifted left (toward lower intensity) relative to the breakpoint BP1 of histogram 514. The difference (BP1–BPT) represents the additional symbols and/or bits used to represent high-mode pixels (of high mode 512-2).

Defogging logic 410 generates an output image based on the output (e.g., transformed) intensity values. Lossy image/video compression logic 470 compresses the images and/or video from camera 110 for transmission to monitoring station 130. For example, compression logic 470 may input uncompressed image data and output a video stream in the MPEG-4 video format.

In other implementations, controller 260 may include fewer functional components, different functional components, differently arranged functional components, or additional functional components than shown in FIG. 4. Additionally or alternatively, one or more functional components of controller 260 may perform functions described as being performed by one or more other functional components of controller 260 and/or signal processor 250.

Figure 6A:
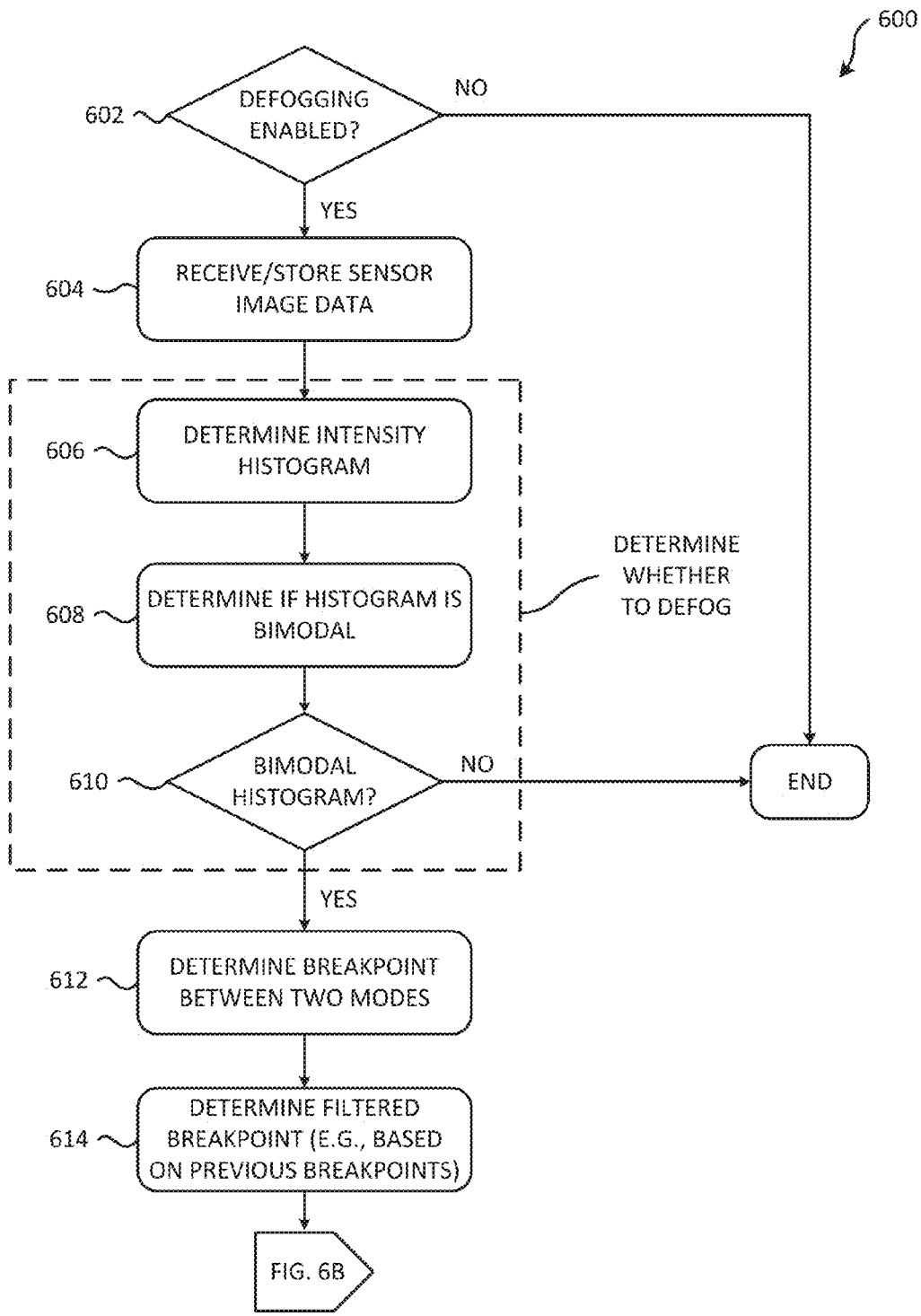
FIGS. 6A and 6B are flowcharts of an exemplary process for defogging an image or a video in one embodiment.
Figure 6B:
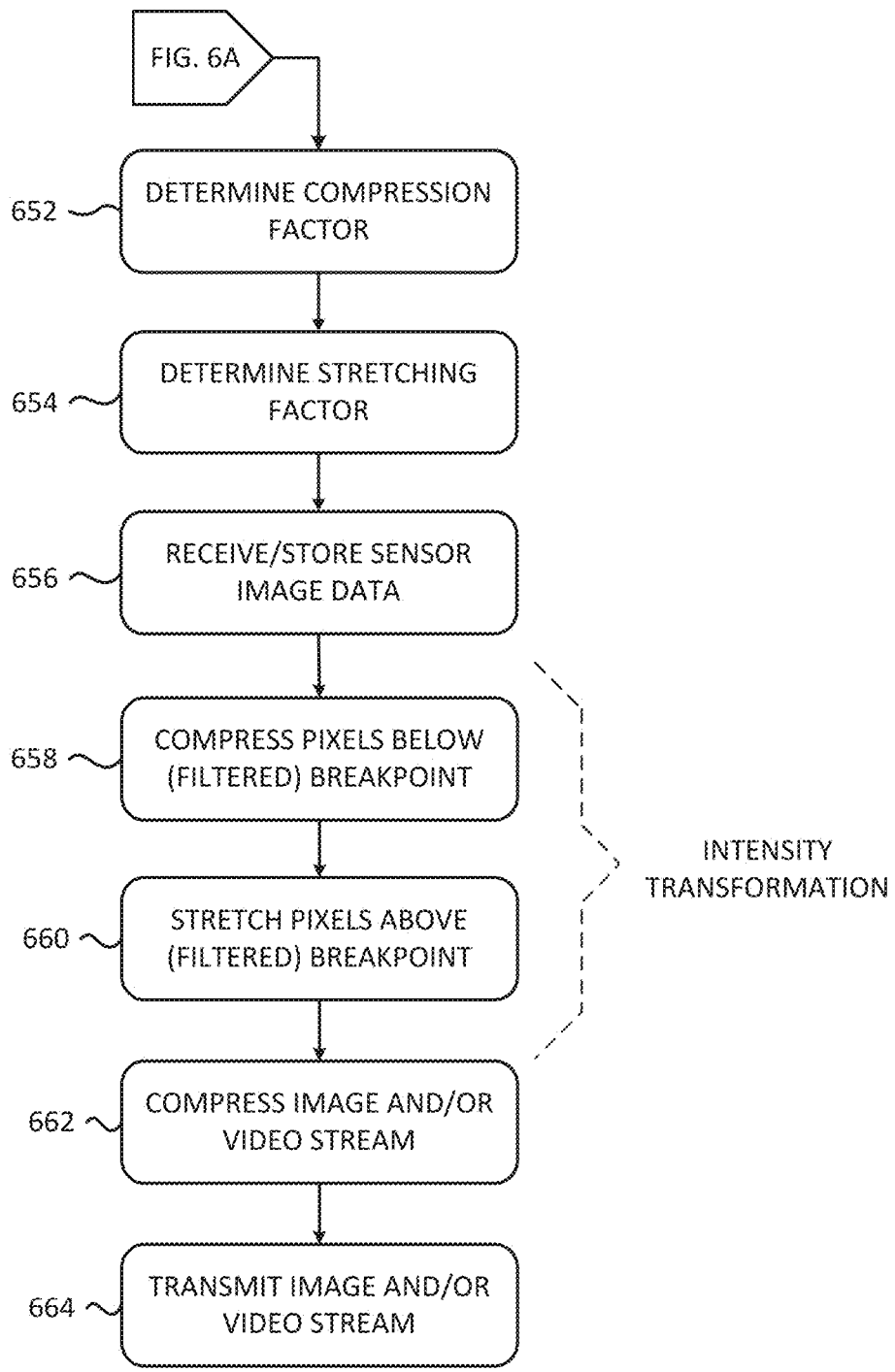

FIGS. 6A and 6B are flowcharts of an exemplary process 600 for defogging an image or a video. Process 600 may be performed by controller 260 and/or signal processor 250. Process 600 assumes that monitoring device 110 is a camera and begins with the determination of whether defogging is enabled as a setting (block 602). A user may turn the defogging feature on, for example, by using UI logic 420. Information regarding whether the feature is on or off may be stored in camera settings 486. If defogging is enabled (block 602: YES), then camera 110 captures an image and receives and stores sensor image data (block 604). Optics chain 210 receives the light, sensor array 240 captures the image, and the sensor image data is stored in sensor data 482, for example.

Defogging logic 410 operates on the sensor image data to determine whether to defog the image (blocks 606, 608, and/or 610). That is, even though the defog feature is turned on, defogging logic 410 may nonetheless not perform defogging on an image. Determining whether to defog an image or video may include histogram logic 430 determining a histogram of the intensity (block 606) of the pixels of the captured sensor image data (e.g., from block 604). Histogram logic 430 may generate the histogram from raw sensor image data, as this data is available from sensor array 240. Further, histogram logic 430 may generate the histogram from a subset of all the sensor image data (e.g., data representing intensity or luminance). In one embodiment, histogram logic 430 may generate a histogram that is an approximation of the true histogram.

Figure 7:
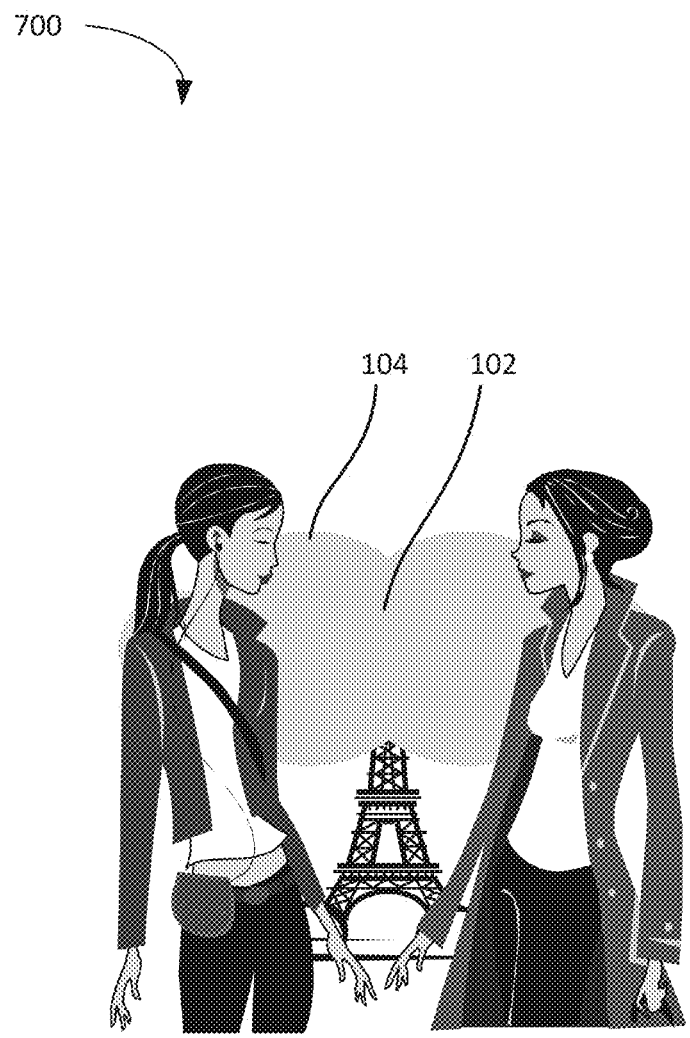
FIG. 7 illustrates an exemplary image captured by a camera in one embodiment.

Histogram logic 430 may determine if the histogram is bimodal (block 608). In the following example, assume that defogging is turned on in camera 110 and that camera 110 has captured an image 700 (as shown in FIG. 7) and generated corresponding sensor image data. In this example, also assume that histogram logic 430 generates histogram 512 (block 606) that corresponds to the sensor image data representing image 700 (see FIG. 5C). Histogram logic 430 also determines that histogram 512 is bimodal (block 608). Histogram logic 430 may determine the histogram is bimodal (block 608) by determining if it includes two local maxima, and/or determining if the pixel intensities are clustered around two well-separated values, for example.

If the histogram is bimodal (block 610: YES), then breakpoint logic 450 determines the breakpoint between the two modes of the histogram (block 612). Determining the breakpoint (block 612) may include determining a first range (or distribution) of intensity values clustered around one of the two well-separated values and determining a second range (or distribution) of intensity values clustered around the other of the two well-separated values. The breakpoint may fall between the first and second ranges. In one embodiment, breakpoint logic 450 may use an estimate of the true histogram to determine the breakpoint. With the breakpoint determined (block 612), process 600 may also determine a filtered breakpoint (block 614). Determining a filtered breakpoint (block 614) is discussed in more detail below. In the current example, histogram 512 is bimodal (block 610: YES) (e.g., low mode of 512-1 and high mode of 512-2) and breakpoint logic 450 determines the breakpoint to be BP1, as shown in FIG. 5C between low mode 512-1 and high mode 512-2. The filtered breakpoint is assumed to be breakpoint BP1 as shown in FIG. 5C. If the histogram is not bimodal (block 610: NO), in one embodiment process 600 may end.

Continuing with process 600 as shown in FIG. 6B, enhancing logic 460 determines a compression factor (if any) to apply to pixels associated with intensity values from the lower of the two modes (block 652) (e.g., low mode 512-1). The compression factor may be set through UI logic 420 by the operator of monitoring station 130 (e.g., a factor from 1 to 100) and stored in camera settings 486. A factor of 1 may result in no compression below breakpoint BP1. A factor of 100 may result in a very high compression (e.g., to a single intensity value of zero).

Enhancing logic 460 may also determine a stretching factor (block 654). The stretching factor may be based in part on the compression factor determined in block 652. That is, the stretching factor may be limited by the compression factor. For example, a compression factor of 1 may mean that pixels associated with intensity values above the original breakpoint (high-mode pixels) are limited to intensity values from above the original breakpoint, thus constraining the stretching factor. A compression factor of greater than 1 may mean that pixels associated with intensity values above the original breakpoint (high-mode pixels) may be stretched to include (e.g., use) intensity values below the original breakpoint (e.g., intensity values originally used for low-mode pixels). In the current example, assume that the operator has chosen a compression factor of 20, e.g., greater than 1. In one embodiment, the stretching factor may be stored in camera settings 486 and set by the operator through UI logic 420.

In one embodiment, camera 110 may receive and store additional sensor image data (block 656). The sensor image data received and stored in block 604 may have been for sensing the light intensity of monitored area 106 (e.g., for determining histogram 512 and breakpoint BP1). The image sensor data received and stored in block 656, on the other hand, may include additional information to generate image data for transmission to an operator to view (e.g., after processing). In one embodiment, the sensor image data received and stored in block 604 is the same as the sensor image data received and stored in block 656.

Enhancing logic 460 may compresses (transform) the range of intensity values of the pixels below the breakpoint (block 658). In other words, enhancing logic 460 compresses (e.g., transforms) the distribution of intensity values of low-mode pixels relative to the rest of the distribution. As shown in FIG. 5C, in this example, the pixels associated with intensities below the breakpoint (low-mode pixels of low mode 512-1) have their intensities compressed (e.g., transformed or linearly scaled down) so that the resulting image has an intensity histogram as shown with histogram 516 (e.g., low mode 516-1). In one embodiment, the transformation (compressing) may include a shift as well as a scaling (e.g., if lower intensity values are not used in low mode 512-1). If the compression factor were 1 (instead of 20), on the other hand, then effectively no compression occurs and low mode 512-1 may be transformed to low mode 514-1 as shown in FIG. 5B.

Enhancing logic 460 may also stretch (transform) the range of intensity values of the pixels above the breakpoint (high-mode pixels) (block 660). In other words, enhancing logic 460 may stretch (e.g., transform) the distribution of intensity values of high-mode pixels relative to the rest of the distribution. As shown in FIG. 5C, in this example, the pixels associated with intensities above the breakpoint (high-mode pixels of high-mode 512-2) have their intensities stretched (e.g., transformed or linearly scaled up) so that the resulting image has an intensity histogram as shown with high mode 516-2 of histogram 516. In one embodiment, the transformation (stretching) may include a shift as well as a scaling (e.g., if compression of the low mode provides additional intensity values for expressing intensities of high-mode pixels). As shown in FIG. 5C, for example, the transformation of high mode 512-2 into high mode 516-2 results in transformed high mode 516-2 such that high-mode pixels occupy intensity values that were previously occupied by low-mode pixels of low mode 512-1. These intensity values are shown by the difference between BP1 and BPT. In other words, the compression factor (which may be a user-defined parameter) may determine the extent to which stretching the high mode 512-2 range of intensity values includes intensity values from below the original breakpoint (in low mode 512-1).

As a result of the intensity transformation, contrast is increased (or stretched) for pixels in the high mode (e.g., high mode 512-1 to high mode 516-2). Further, contrast is decreased for pixels in the low mode (e.g., low mode 512-1 to low mode 516-1). Because fog is likely represented by pixels from the high mode, contrast is increased for pixels in the high mode. As a result, objects shrouded by a cloud of fog may be more easily identified by an operator. Therefore, as shown in FIG. 1C (as compared to FIG. 1B), an operator may be able to distinguish the Eiffel tower (object 102') with defogging, whereas the operator may not have been able to otherwise (FIG. 1B).

The cloud of fog, however, may not be the only portion of the image represented by high-mode pixels. In fact, it is likely that other, non-fog portions of the image are represented by high-mode pixels—and these portions of the image may not require contrast stretching to improve visibility for the operator. Nonetheless, contrast stretching of all high-mode pixels (fog or not) may be harmless or at least expedient for effectively identifying and contrast stretching the portions of the image having the cloud of fog. Further, contrast stretching the high-mode pixels may be at the expense of low-mode pixels. That is, the low-mode pixels potentially have a reduced number intensity values to represent intensity. As a result, the contrast of objects represented by low-mode pixels may be worse or reduced. Nonetheless, the operator may choose this tradeoff to view objects shrouded by the cloud of fog (and have that process performed by the camera using the provisioned bandwidth).

In one embodiment, the image and/or video is compressed (block 662) for easier storage and transmission. For example, lossy compression logic 470 may compress the image and/or video stream into an MPEG-4 video stream. A compressed image may require less storage space and lower bandwidth for transmission. The compressed image and/or video is transmitted (block 624) from camera 110 to a monitoring station 130 through a network 120, as shown in FIG. 1C.

As discussed above, in one embodiment the breakpoint determined in block 612 (of the current image) may be filtered (e.g., low-pass filtered) (block 614) with breakpoints determined from previous images (e.g., previous images of a video stream). Filtering the breakpoint may be beneficial because objects that appear briefly (e.g., but not in the fog) in a video stream may cause the breakpoint to shift rapidly. Breakpoint logic 450 may remove these rapid shifts by filtering the breakpoint of the current image with breakpoints from previous images. That is, defogging logic 410 may continuously analyze images in a video and store breakpoints determined by breakpoint logic 450. Thus, the stored breakpoints from previous images and the current image may be filtered to determine a breakpoint to use for defogging.

Thus, breakpoint logic 450 may determine a previous histogram of intensity values for pixels in a previous image or previous images (e.g., in a video stream) (and the previous histograms may be bimodal), and determine the previous breakpoint or the previous breakpoints between the two modes of the previous histogram(s). The breakpoint logic 450 may then determine the breakpoint to apply for the current image based on the previous breakpoint (e.g. by low-pass filtering). Low-pass filtering may include, for example, taking the average breakpoint of the current and previous 30 images in a video stream. If filtering occurs, then process 600 may defog the image (blocks 658 and 660) using the filtered breakpoint determined in block 614. In one embodiment, process 600 may defog an image based on a previous breakpoint (e.g., a filtered breakpoint) even when a current histogram of current image sensor data is not bimodal.

Besides linear scaling and offsetting (shifting), other intensity transformations are possible for stretching and compressing. For example, histogram equalization may be part of the transformation (either the stretching or compressing).

In the preceding specification, various embodiments have been described with reference to the accompanying drawings. It will, however, be evident that various modifications and changes may be made thereto, and additional embodiments may be implemented, without departing from the broader scope of the invention as set forth in the claims that follow. The specification and drawings are accordingly to be regarded in an illustrative rather than restrictive sense. For example, while series of blocks have been described with respect to FIGS. 6A and 6B, the order of the blocks and/or signal flows may be modified in other implementations. Further, non-dependent blocks and/or signal flows may be performed in parallel.

It will be apparent that systems and/or methods, as described above, may be implemented in many different forms of software, firmware, and hardware in the implementations illustrated in the figures. The actual software code or specialized control hardware used to implement these systems and methods is not limiting of the embodiments. Thus, the operation and behavior of the systems and methods were described without reference to the specific software code—it being understood that software and control hardware can be designed to implement the systems and methods based on the description herein.

Further, certain portions, described above, may be implemented as a component that performs one or more functions. A component, as used herein, may include hardware, such as a processor, an ASIC, or a FPGA, or a combination of hardware and software (e.g., a processor executing software).

The term "logic," as used herein, may refer to a combination of one or more processors configured to execute instructions stored in one or more memory devices, may refer to hardwired circuitry, and/or may refer to a combination thereof. Furthermore, a logic may be included in a single device or may be distributed across multiple, and possibly remote, devices.

It should be emphasized that the terms "comprises" and/or "comprising," as used herein specify the presence of stated features, integers, steps or components but does not preclude the presence or addition of one or more other features, integers, steps, components or groups thereof. Further, the term "exemplary" (e.g., "exemplary embodiment," "exemplary configuration," etc.) means "as an example" (e.g., "an embodiment in an example," "a configuration in one example," etc.).

No element, act, or instruction used in the present application should be construed as critical or essential to the embodiments unless explicitly described as such. Also, as used herein, the article "a" is intended to include one or more items. Further, the phrase "based on" is intended to mean "based, at least in part, on" unless explicitly stated otherwise.

What is claimed is:

1. A method comprising:
   determining a histogram of input intensity values for pixels in image sensor data, wherein the image sensor data includes a video stream having a plurality of images;
   determining, by a processor, whether the histogram is bimodal, wherein when the histogram is determined to be bimodal with two modes, the method further comprising:
      determining a breakpoint between the two modes such that the breakpoint is a low-pass filtering of a plurality of breakpoints corresponding to the plurality of images,
      wherein the histogram includes a first distribution of the input intensity values below the breakpoint and a second distribution of the input intensity values above the breakpoint;
   generating output intensity values, corresponding to and based on the input intensity values, such that:
      a third distribution of the output intensity values, corresponding to the input intensity values below the breakpoint, is compressed relative to the first distribution, and
      a fourth distribution of the output intensity values, corresponding to the input intensity values above the breakpoint, is stretched relative to the second distribution; and
   generating an output image based on the output intensity values.

2. The method of claim 1, wherein the plurality of images includes a current image in the video stream and a previous image in the video stream, the method further comprising:
   determining a previous histogram of intensity values for pixels in the previous image, wherein the previous histogram is bimodal; and
   determining the breakpoint for the current image based on a previous breakpoint between the two modes of the previous histogram.

3. The method of claim 2,
   wherein the video stream includes at least three images, and
   wherein the breakpoint for the current image is determined based on a plurality of previous breakpoints between modes in the corresponding plurality of previous images.

4. The method of claim 3, further comprising:
   generating an output video stream based on the output intensity values;
   compressing the output video stream to generate a compressed video stream; and
   transmitting the compressed video stream to a monitoring station.

5. The method of claim 1, wherein determining that the histogram is bimodal includes determining that the histogram includes two local maxima.

6. The method of claim 1, wherein determining that the histogram is bimodal includes:
   determining that the pixel intensities are clustered around two separated values.

7. The method of claim 1, further comprising generating output intensity values such that the output intensity values, corresponding to the input intensity values above the breakpoint, include an intensity value below the breakpoint.

8. The method of claim 7, wherein a user-defined parameter determines an extent to which the fourth distribution of intensity values includes output intensity values below the breakpoint.

9. The method of claim 1,
   wherein the fourth distribution of the output intensity values, corresponding to the input intensity values above the breakpoint, is stretched, relative to the second distribution, based on the compression of the third distribution relative to the first distribution.

10. The method of claim 9, wherein the breakpoint between the two modes is an input breakpoint, the method further including:
    generating the output image such that a histogram of output intensity values for pixels of the output image is bimodal with an output breakpoint between two modes, and
    wherein the output image breakpoint is at a lower intensity value than the input breakpoint.

11. A device comprising:
    a camera to capture an image and generate image sensor data; and
    a processor to
       determine a histogram of input intensity values for pixels in the image sensor data, wherein the image sensor data includes a video stream having a plurality of images;
       determine whether the histogram is bimodal such that the breakpoint is a low-pass filtering of a plurality of breakpoints corresponding to the plurality of images, wherein the processor determines that the histogram is bimodal with two modes;

determine a breakpoint between the two modes, wherein the histogram includes a first distribution of the input intensity values below the breakpoint and a second distribution of the input intensity values above the breakpoint;

generate output intensity values, corresponding to and based on the input intensity values, such that:
- a third distribution of the output intensity values, corresponding to the input intensity values below the breakpoint, is compressed relative to the first distribution, and
- a fourth distribution of the output intensity values, corresponding to the input intensity values above the breakpoint, is stretched relative to the second distribution; and generate an output image based on the output intensity values.

12. The device of claim 11, wherein the plurality of images includes a current image in the video stream and a previous image, and wherein the processor is further configured to:

determine a previous histogram of intensity values for pixels in the previous image, wherein the previous histogram is bimodal;

determine a current histogram of intensity values for pixels in the current image, wherein the current histogram is bimodal; and determine the breakpoint based on a previous breakpoint between the two modes of the previous histogram and a current breakpoint between the two modes of the current histogram.

13. The device of claim 12,
wherein the video stream includes at least three images, and
wherein, when determining the breakpoint, the processor is further configured to determine the breakpoint based on at least three breakpoints between modes in the corresponding at least three images.

14. The device of claim 13, wherein the processor is further configured to:

generate an output video stream based on the output intensity values; and compress the output video stream to generate a compressed video stream, wherein the device further includes a transmitter to send the compressed video stream across a network to a monitoring station.

15. The device of claim 11, wherein when the processor determines that the histogram is bimodal, the processor is further configured to determine that the histogram includes two local maxima.

16. The device of claim 11, wherein when the processor determines that the histogram is bimodal, the processor is further configured to:

determine that pixel intensities are clustered around two separated values.

17. The device of claim 11, wherein the processor is configured to generate output intensity values such that the output intensity values, corresponding to the input intensity values above the breakpoint, include an intensity value below the breakpoint.

18. The device of claim 17, wherein a user-defined parameter determines an extent to which the processor is configured to generate output intensity values such that the fourth distribution output intensity values below the breakpoint.

* * * * *